United States Patent
Furukawa

(10) Patent No.: US 8,610,799 B2
(45) Date of Patent: Dec. 17, 2013

(54) MAGNIFYING PLAYBACK/DISPLAY

(75) Inventor: Nobuyuki Furukawa, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/360,880

(22) Filed: Jan. 30, 2012

(65) Prior Publication Data

US 2012/0127358 A1    May 24, 2012

Related U.S. Application Data

(63) Continuation of application No. 10/787,655, filed on Feb. 25, 2004, now Pat. No. 8,130,287.

(30) Foreign Application Priority Data

Feb. 27, 2003 (JP) ................................. 2003-051307

(51) Int. Cl.
*H04N 5/262* (2006.01)

(52) U.S. Cl.
USPC ............... 348/240.99; 348/240.1; 348/240.2; 348/240.3

(58) Field of Classification Search
USPC .................. 348/240.99, 240.1, 240.2, 240.3; 396/73, 76, 85
See application file for complete search history.

(56) References Cited

U.S. PATENT DOCUMENTS 6,445,399 B1 * 9/2002 Sroka et al. .................... 715/767
2003/0071904 A1 * 4/2003 Karasaki et al. ............ 348/231.3

FOREIGN PATENT DOCUMENTS

JP         01096639 A  *  4/1989

* cited by examiner

*Primary Examiner* — Yogesh Aggarwal
(74) *Attorney, Agent, or Firm* — Cowan, Liebowitz & Latman, P.C.

(57) ABSTRACT

An image sensing apparatus which stores an image signal from an image sensing element and reads out and processes the stored image signal to magnify and display an image on a display device includes a designation unit that designates the magnification ratio of the image to be displayed, a storage unit that stores the magnification ratio designated by the designation unit, and a magnifying processing unit that executes magnifying processing for the stored image signal on the basis of the magnification ratio stored in the storage unit and outputs the image signal to the display device. The magnification ratio stored in the storage unit is updated when a different magnification ratio is designated by the designation unit, and the magnification ratio stored in the storage unit is used for a plurality of images that are sequentially displayed.

41 Claims, 15 Drawing Sheets

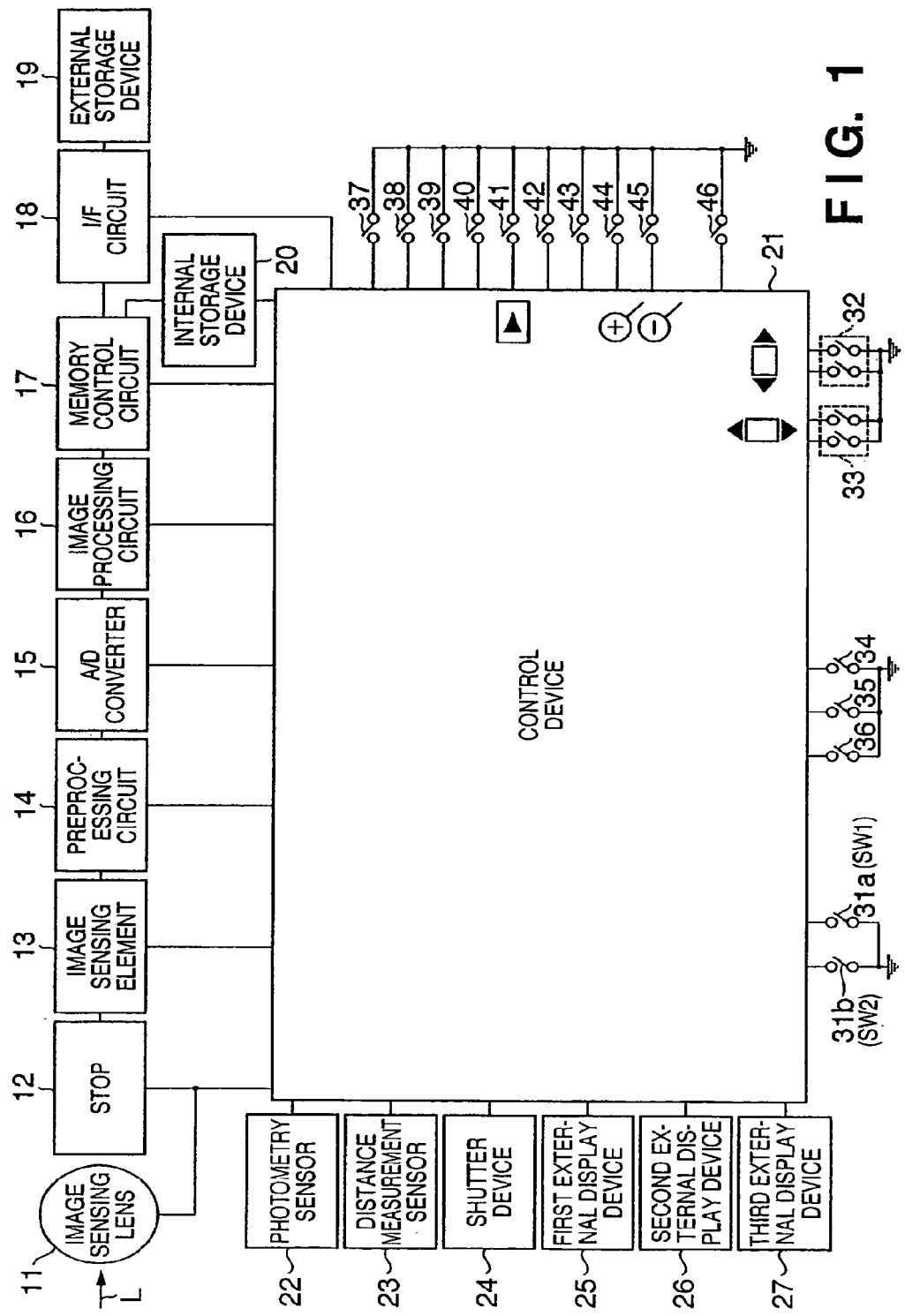

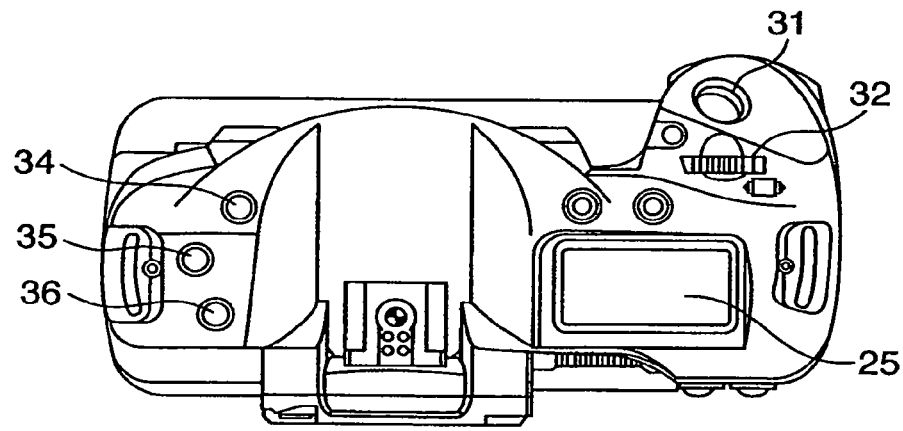
F I G. 2A
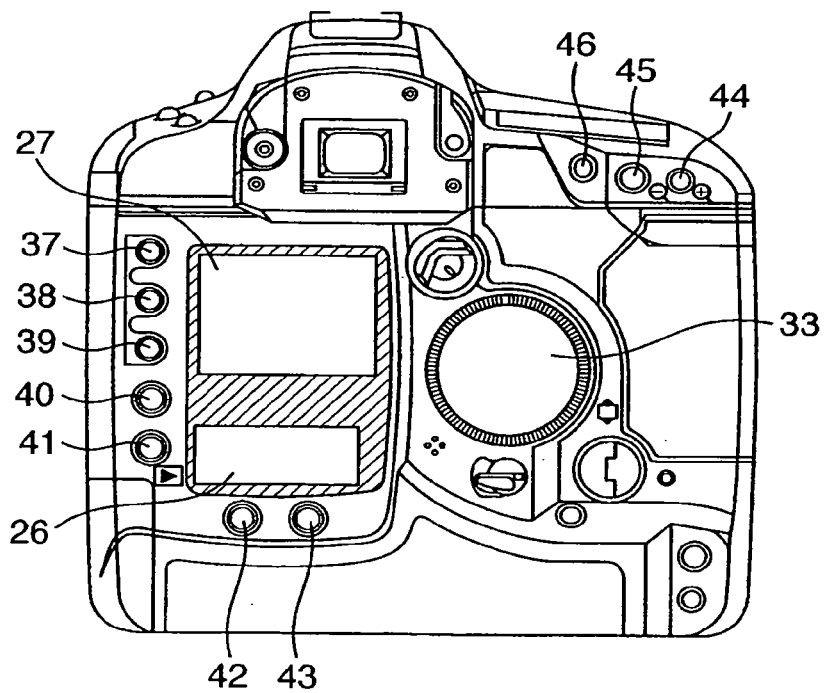
F I G. 2B

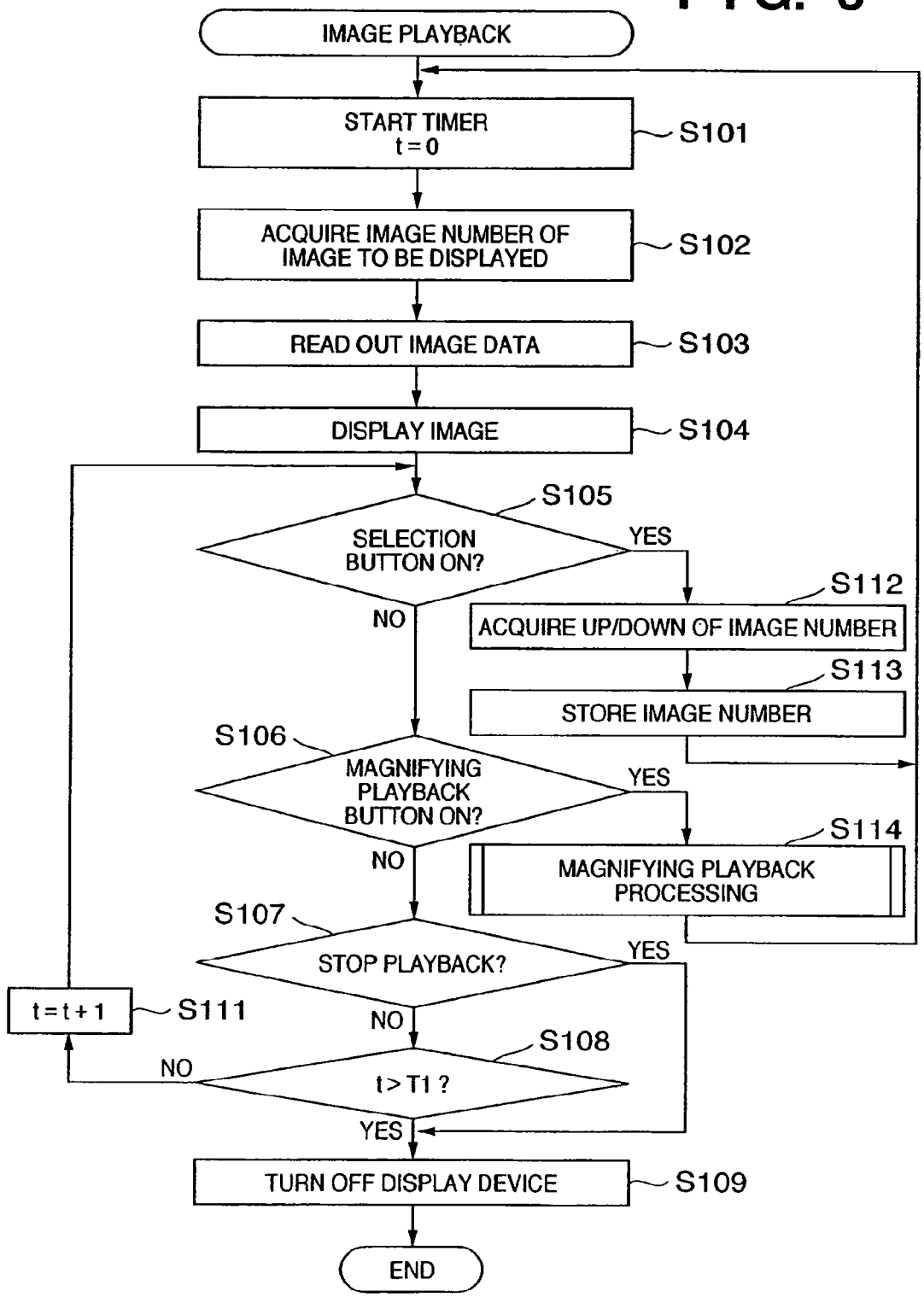

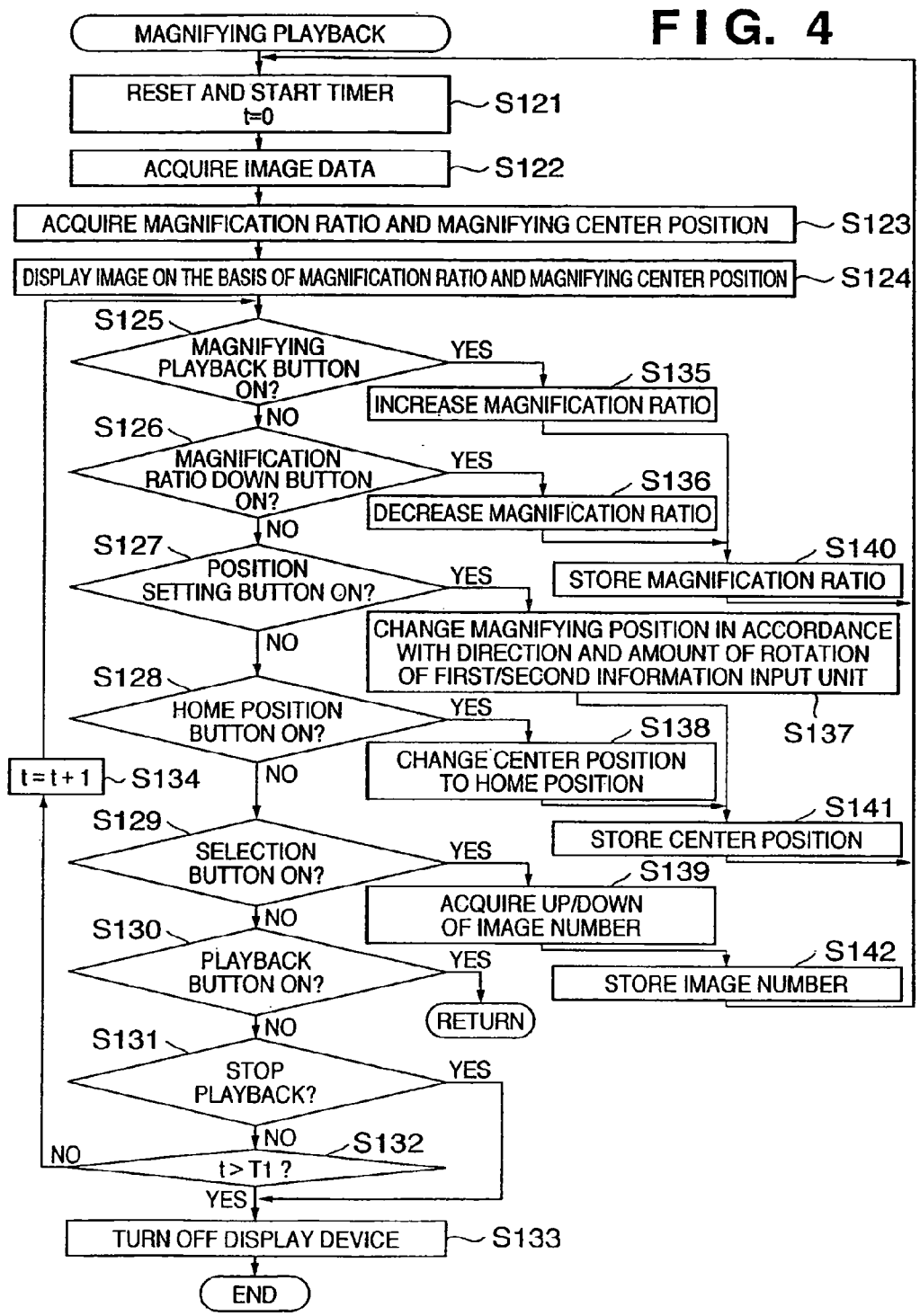

F I G. 11A
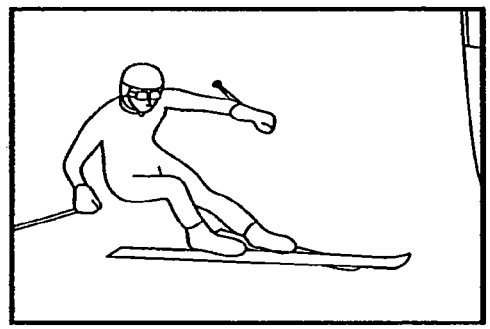
F I G. 11B
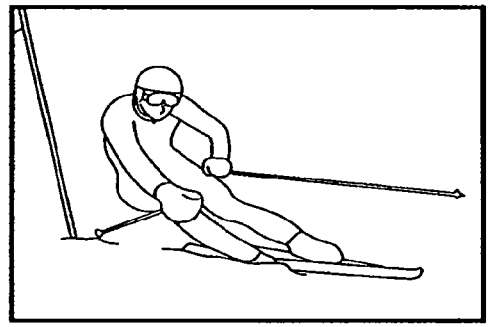

F I G. 15
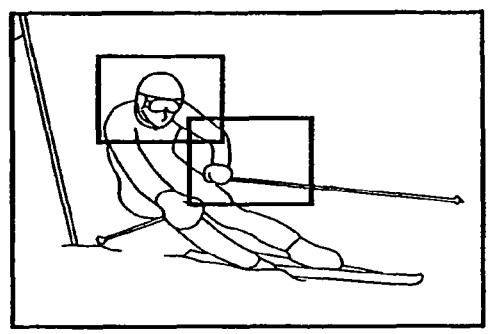

MAGNIFYING PLAYBACK/DISPLAY

CROSS-REFERENCE TO RELATED APPLICATION

This application is a continuation of application Ser. No. 10/787,655, filed Feb. 25, 2004, the entire disclosure of which is hereby incorporated by reference.

FIELD OF THE INVENTION

The present invention relates to an image sensing apparatus such as a digital camera which has an image display device and, more particularly, to a magnifying playback/display technique for an image display device.

BACKGROUND OF THE INVENTION

In digital cameras, conventionally, an image sensed by using an image sensing element is converted into image data and recorded in the internal memory of the digital camera or on a recording medium such as a detachable memory card. Many of such digital cameras have display devices such as a liquid crystal monitor, and obtained image data can be displayed on the display device so that the user can confirm the sensed image.

A display/playback device such as a liquid crystal monitor used in a digital camera is small and simple and therefore cannot display all pixels of the sensed image. To display an image, the number of pixels is reduced by, e.g., thinning them. Although the composition of an object can be confirmed even on such a small and simple display/playback device, precise conditions such as the focus state of an image cannot be confirmed. For this purpose, a digital camera having a function of magnifying and playing back part of an image has been proposed.

The magnifying playback/display function will be described below with reference to the accompanying drawings.

The magnifying playback/display function causes a playback image selector to select an image to be played back and magnifies and plays back the selected image. In a sensed image shown in FIG. 11A, the central region of the screen is magnified first by the magnifying playback/display function. The magnified portion for the image shown in FIG. 11A corresponds to, e.g., the rectangular frame portion at the center in FIG. 12A. The frame size changes depending on the magnification ratio. More specifically, when the magnification ratio is high, the frame size decreases to magnify a smaller region. When the magnification ratio is low, the frame becomes large to magnify a wider region. FIG. 13A shows only the portion inside the rectangular frame in FIG. 12A. This image is magnified in the magnifying playback/display mode and displayed on an external display device of the digital camera.

To magnify and confirm another portion of the image, the magnifying playback region is changed by using a position selection unit, thereby obtaining a necessary image. An example will be described below, in which the photographer wants to confirm the shot state of the head part of a person as an object in the image shown in FIG. 11A and changes the magnified region.

FIG. 13B shows an image which is obtained when the magnified region is moved upward by several steps from the state shown in FIG. 13A in order to confirm the upper portion of the current image. The magnified region corresponding to the image shown in FIG. 13B in the image shown in FIG. 11A is indicated by a rectangular frame in FIG. 12B. Since the left hand of the person can be recognized in FIG. 13B, the user can know that the head part of the object is present on the left side of the part shown in FIG. 13B. FIG. 13C shows an image which is obtained by moving the magnified region to the left from the state shown in FIG. 13B. The magnified region corresponding to the image shown in FIG. 13C in the image shown in FIG. 11A is indicated by a rectangular frame in FIG. 12C. FIG. 13C shows the head part of the person as the object, though the head part is not wholly displayed. FIG. 13D shows an image which is obtained when the magnified region is moved upward from the state shown in FIG. 13C in order to display the entire head part. The magnified region corresponding to the image shown in FIG. 13D in the image shown in FIG. 11A is indicated by a rectangular frame in FIG. 12D. In this way, the magnifying/playback position can be changed to the photographer's desired position. Hence, the image can be confirmed even on the small and simple display/playback device.

However, this method is cumbersome for magnifying and playing back a plurality of images.

To magnify and playing back another image different from the image that is currently being played back, the magnifying playback of the current magnified image is ended, and then, another image is selected by the image selector. After that, the magnifying playback mode must be set to magnify the central portion of the image and move the magnified region to a desired position.

Photographer's desired magnifying playback portions are not always present at the center and tend to concentrate at his/her favorite position. Further, in a series of images taken in a continuous shooting mode, the region to be magnified and confirmed is often present at the same position.

For example, FIG. 11B shows an image that is sensed next to the image shown in FIG. 11A in the continuous shooting mode. When magnifying is done in accordance with the conventional procedures, the image shown in FIG. 14A is displayed first. However, the image shown in FIG. 14B is the photographer's desired magnified image. The rectangular frames shown in FIG. 15 indicate the relationship between FIGS. 14A and 14B in the image shown in FIG. 11B. As is apparent from FIG. 15, the magnified regions shown in FIGS. 13D and 14B in the original images are at the same position. However, to obtain the magnified image shown in FIG. 14B, the same magnified region change operation as that executed in obtaining the image shown in FIG. 13D for the image shown in FIG. 11A must be executed again.

Some digital cameras display a sensed image for a short time right after sensing the image (this function is referred to as "REC review" hereinafter) so that the photographer can confirm the sensed image immediately after sensing. When the image is magnified during the REC review, details of the image can be confirmed even in the REC review mode. However, when a series of photographs are taken by continuous shooting and almost the same regions in the series of images should be magnified and confirmed in the REC review mode, the above operation must be repeated, i.e., a the central region is magnified for each image, and the magnified region must be moved from the central portion to the desired region.

Since this operation is cumbersome, and it requires considerable time to confirm images, the user may lose the next shutter chance.

SUMMARY OF THE INVENTION

The present invention has been made in consideration of the above situation, and has as its object to increase the operability in magnifying playback on the display device of a digital camera.

According to the present invention, the foregoing object is attained by providing an image sensing apparatus which stores an image signal from an image sensing element and reads out and processes the stored image signal to magnify and display an image on a display device, comprising: a designation unit that designates a magnification ratio of the image to be displayed; a storage unit that stores the magnification ratio designated by the designation unit; and a magnifying processing unit that executes magnifying processing for the stored image signal on the basis of the magnification ratio stored in the storage unit and outputs the image signal to the display device, wherein the magnification ratio stored in the storage unit is updated when a different magnification ratio is designated by the designation unit, and the magnification ratio stored in the storage unit is used for a plurality of images that are sequentially displayed.

According to the present invention, the foregoing object is also attained by providing a playback method which stores an image signal from an image sensing element and reads out and processes the stored image signal to magnify and display an image on a display device, comprising: designating a magnification ratio of the image to be displayed; storing the designated magnification ratio; and executing magnifying processing for the stored image signal on the basis of the magnification ratio stored in the storage step and outputting the image signal to the display device, wherein the stored magnification ratio is updated when a different magnification ratio is designated in the designating step, and the stored magnification ratio is used for a plurality of images that are sequentially displayed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the overall arrangement of a digital camera according to first and second embodiments of the present invention;

FIG. 2A is a plan view showing the outer appearance of the digital camera according to the first and second embodiments of the present invention;

FIG. 2B is a rear view showing the outer appearance of the digital camera according to the first and second embodiments of the present invention;

FIG. 3 is a flow chart showing image playback processing according to the first embodiment of the present invention;

FIG. 4 is a flow chart showing magnifying playback processing according to the first embodiment of the present invention;

FIGS. 11A and 11B are views for explaining conventional image magnifying processing;

FIG. 15 is a view showing the positional relationship between the image shown in FIG. 11B and magnified regions when the magnified region is changed in the prior art.

DETAILED DESCRIPTION OF THE PREFERRED EMBODIMENTS

Figure 5A:
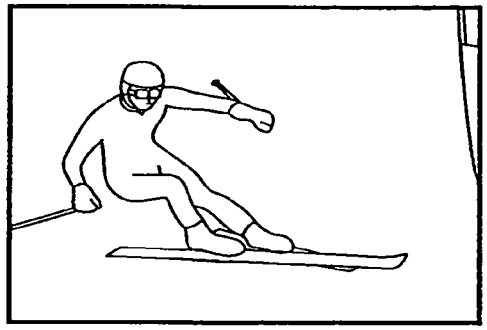
FIGS. 5A to 5D are views showing a series of images taken in a continuous shooting mode according to the first embodiment of the present invention.

Preferred embodiments of the present invention will be described in detail in accordance with the accompanying drawings. The sizes, shapes, and relative layout of constituent elements exemplified in the embodiments should appropriately be changed in accordance with the arrangement and conditions of the apparatus to which the present invention is applied. The present invention is not limited to these illustrative embodiments.

<First Embodiment>

FIG. 1 is a block diagram showing the overall arrangement of a digital camera according to the first embodiment of the present invention. The arrangements and operations of the respective elements will be described with reference to FIG. 1.

Light L from an object is received by an image sensing element 13 through an image sensing lens 11 and stop 12. The image sensing element 13 is an element that converts received light into an electrical signal and is constituted by a solid-state image sensing element such as a CCD (charge-coupled device) and CMOS device. A preprocessing circuit 14 has a correlated double sampling (CDS) circuit that removes output noise of the image sensing element 13 and a nonlinear amplification circuit that executes nonlinear amplification before A/D conversion. An A/D converter 15 converts the analog output from the preprocessing circuit 14 into a digital signal. The converted digital image signal is transferred to an image processing circuit 16, undergoes image processing such as contour compensation, gamma correction, and white balance correction, and is output to a memory control circuit 17.

The memory control circuit 17 causes an external storage device 19 such as a memory card to store, through an interface circuit 18, the image signal generated by the image processing circuit 16. An internal storage device 20 is a storage device which stores the above-described white balance correction value and the like.

The stop 12 is controlled by a control device 21 on the basis of the output from a photometry sensor 22 that measures the brightness of the object. A distance measurement sensor 23 is formed from a line sensor such as a known CCD or CMOS and arranged so as to sense the distance measurement point of the image sensing element 13. The distance measurement sensor 23 outputs, to the control device 21, a defocused amount signal corresponding to the distance to the object. On the basis of various input signals described above, the control device 21 calculates the exposure value and decides the shutter speed and F-number, thereby controlling operation of a shutter device 24.

A first external display device 25 is a liquid crystal display that displays various kinds of setting information mainly related to exposure control. A second external display device 26 is a liquid crystal display that displays various kinds of setting information mainly related to image processing. A third external display device 27 is a color liquid crystal display which can play back a sensed image and display information related to the sensed image, which is obtained from the image sensing element 13, and various detailed setting states of the digital camera.

Reference numeral 31a denotes an image sensing preparation switch 31a (SW1); and 31b, an image sensing designation switch (SW2). Reference numeral 32 denotes a first information input unit for inputting various kinds of image sensing setting information, and, in an normal playback mode, for selecting an image to be played back, and, in a magnifying playback mode, for setting the horizontal position in selecting a position; and 33, a second information input unit for inputting various kinds of image sensing setting information, and, in the normal playback mode, for selecting an image to be played back, and, in the magnifying playback mode, for setting the vertical position in selecting a position; and 34, 35 and 36, mode setting units for selecting various sensing setting modes. Specifically, reference numeral 34 denotes an image sensing mode selection button; 35, AF mode selection button; and 36, photometry mode selection button.

Digital system setting selection units 37 to 43 are used for various settings and selections related to image processing mainly corresponding to the second external display device 26 and third external display device 27. Specifically, reference numeral 37 denotes a print button; 38, a menu button which is pressed to make a set menu of the digital camera displayed on the third external display device 27; 39, a selection button which is used to perform various selections when the set menu of the digital camera is displayed in response to the pressing the menu button 38 and to select an image in the normal image playback mode or magnifying playback mode; 40, a position setting button which is used together with the first information input unit 32 and second information input unit 33 to select the position of an image to be magnified; 41, a playback button for initiating playback of a sensed image in response to the depression of the play back button 41; 42, an image erase button; and 43, a white balance setting button.

A magnifying playback button 44 is used to set the magnifying playback mode. During the magnifying playback mode, the magnifying playback button 44 also serves to designate an increase in magnification ratio. A magnification ratio down button 45 is used to input designation for decreasing the magnification ratio during magnifying playback. When a home position button 46 is pressed during magnifying playback, the magnifying playback region returns to the image center.

FIG. 2A is a plan view and FIG. 2B is a rear view of the digital camera according to the first embodiment. The same reference numerals as in FIG. 1 denote the same components in FIGS. 2A and 2B, and a detailed description thereof will be omitted.

As shown in FIG. 2A, the first external display device 25 is arranged on the upper surface of the digital camera main body. As shown in FIG. 2B, the second external display device 26 is arranged on the rear surface of the digital camera main body. The third external display device 27 is arranged on the rear surface of the digital camera main body, i.e., almost on the same surface as the second external display device 26, as shown in FIG. 2B.

Reference numeral 31 denotes a release button. The image sensing preparation switch (SW1) 31a is turned on at the first stroke position (e.g., half stroke) of the release button 31. The image sensing designation switch (SW2) 31b is turned on at the second stroke position (e.g., full stroke) of the release button 31. Each of the first information input unit 32 and second information input unit 33 is constituted by a rotary dial input operation member.

The digital system setting selection units 37 to 43 are arranged on the rear surface of the digital camera main body, i.e., almost on the same surface as the second external display device 26, as shown in FIG. 2B.

An image playback operation of the digital camera according to the first embodiment having the above arrangement will be described next with reference to the flow chart shown in FIG. 3.

Given that image sensing operations have been performed, and image data is already written in the external storage device 19. When the playback button 41 is pressed in this state, the image playback mode starts. A unique number (referred to as "image number" hereinafter) is automatically assigned to each image by the digital camera at the time of image sensing.

When the image playback mode starts, a timer t is cleared and then started to count time in step S101. The timer t is a counter for measuring the time until display on the third external display device 27 is turned off. Although a detailed description of the operation is omitted here, the user can arbitrarily select the time until the third external display device 27 is turned off.

In step S102, the control device 21 reads out, from the internal storage device 20, the image number of an image to be played back. In step S103, data corresponding to the image number acquired in step S102 is loaded from the external storage device 19 to the internal storage device 20 and converted into data displayable within the display range of the third external display device 27. In step S104, the image data loaded to the internal storage device 20 is arithmetically processed, and the third external display device 27 is caused to display the image.

Unless a button operation in step S105 or S106 is performed, or a playback stop designation is input in step S107 (the operations will be described later), the displayed image is continuously displayed until the timer t exceeds T1 in step S108. In step S111, the value of the timer t is incremented by one. When the value of the timer t continuously increases and exceeds T1 in step S108, the flow advances to step S109 to turn off the third external display device 27, thus ending the image playback processing.

If the selection button 39 is pressed in step S105, an image selection state is set, and the flow advances to step S112. In step S112, the number of the displayed image is changed in response to operation of the first information input unit 32 or second information input unit 33. For example, when the first information input unit 32 or second information input unit 33 is rotated clockwise, the image number increases. When the unit 32 or 33 is rotated counterclockwise, the image number decreases.

When the image number is decided in step S112, the decided image number is stored in the internal storage device 20 in step S113, and the flow returns to step S101. The image having the selected image number is displayed on the third external display device 27 by the above-described processing in steps S101 to S104.

When the magnifying playback button 44 is pressed (YES in step S106), the flow advances to step S114 to execute magnifying playback processing. The magnifying playback processing will be described later in detail with reference to FIG. 4.

When an image playback stop designation is input in step S107, the flow advances to step S109 to turn off the third external display device 27, thus ending the image playback processing. The image playback stop is executed, for example, when an operation except the image playback mode is designated by the menu button 38 or various selection buttons, or the image sensing preparation switch (SW1) 31a is pressed to immediately set the image sensing preparation state.

The magnifying playback processing will be described next with reference to FIG. 4.

In step S121, the timer t is cleared and then started to count time.

Since the image number to be displayed is already decided before step S106 in FIG. 3, the control device 21 loads the image data from the external storage device 19 to the internal storage device 20 in step S122. The image data is converted into data displayable within the display range of the third external display device 27.

In step S123, the control device 21 acquires the magnification ratio and the central position (magnifying center position) of the magnification region from the internal storage device 20 to decide the range to be displayed on the third external display device.

In step S124, an image that is magnified on the basis of the magnification ratio and magnifying center position acquired in step S123 is displayed on the third external display device 27.

Unless a button is pressed during processing in steps S125 to S130, or a magnifying playback stop designation is input in step S131 (the operations will be described later), the magnified image is continuously displayed until the timer t exceeds T1 in step S132. If the timer t does not exceed T1, the value of the timer t is incremented by one in step S134. The value T1 to be compared with the timer t may have either the same value as that used for comparison in step S108 in FIG. 3 or a different value. When the value of the timer t continuously increases in step S134 and exceeds T1 in step S132, the flow advances to step S133 to turn off the third external display device 27, thus ending the image playback processing.

Operations executed when any of the buttons is pressed in any of steps S125 to S130 will be described next.

When the magnifying playback button 44 is pressed in step S125, the flow advances to step S135 to raise the current magnification ratio by one step. In step S140, the raised magnification ratio is stored in the internal storage device 20. Then, the flow returns to step S121.

When the magnification ratio down button 45 is pressed in step S126, the flow advances to step S136 to reduce the current magnification ratio by one step. In step S140, the reduced magnification ratio is stored in the internal storage device 20.

When the position setting button 40 is pressed in step S127, a magnification region selection operation starts. In step S137, calculation for selecting the position of the magnification region in the image is executed in accordance with the rotational amount of the first information input unit 32 and second information input unit 33. When the first information input unit 32 is rotated clockwise, the value of the magnifying center position that indicates a region on the right side of the currently magnified and displayed region is calculated. When the first information input unit 32 is rotated counterclockwise, the value of the magnifying center position that indicates a region on the left side of the currently magnified and displayed region is calculated.

When the second information input unit 33 is rotated clockwise, the value of the magnifying center position that indicates a region on the lower side of the currently magnified and displayed region is calculated. When the second information input unit 33 is rotated counterclockwise, the value of the magnifying center position that indicates a region on the upper side of the currently magnified and displayed region is calculated. The magnifying center position of the magnified image, which is obtained as a result of the calculation, is stored in the internal storage device 20 in step S141, then the flow returns to step S121. The moving directions by the operations of the first information input unit 32 and second information input unit 33 are not limited to those described above and can appropriately be designed. In the above-described example, the magnifying center position of the magnification region is calculated. However, if the magnification region is rectangular, the position of any corner may be calculated and stored.

When the home position button 46 is pressed in step S128, the magnification region returns to a preset region. If default setting has been done at the time of shipment from the factory to display, e.g., the central portion of the screen, calculation is executed to obtain the position of the central portion of the image. In step S141, the obtained position is stored in the internal storage device 20 as the magnifying center position, then the flow returns to step S121.

When the selection button 39 is pressed in step S129, an image selection operation is executed. In step S139, when the first information input unit 32 is operated, the image number of the image to be displayed is changed. When the first information input unit 32 is rotated clockwise, the image number increases. When the first information input unit 32 is rotated counterclockwise, the image number decreases. In step S142, the image number decided in step S139 is stored in the internal storage device 20, then the flow returns to step 121.

When any change is done in step S140, S141, or S142, and the flow returns to step S121, a magnified image corresponding to the changed contents is displayed on the third external display device 27 by the processing in steps S121 to S124.

It should be noted that in the above explanation, when the position setting button 40 or selection button 39 is pressed in step S127 or S129, the dial operation of the first information input unit 32 and/or second information input unit 33 is always performed in step S137 or S139. However, the digital camera has a function of, e.g., restoring the state before pressing of the button (i.e., the flow returns to step S125) if the dial operation is not performed for a predetermined time. For this reason, the processing does not indefinitely wait for the operation of the first information input unit 32 or second information input unit 33 in step S137 or S139.

When the playback button 41 is pressed in step S130, the magnifying playback processing is ended, and the flow returns to step S101 in FIG. 3 to perform the normal playback operation. In this case, the entire image having the same image number as that of the magnified image is displayed.

When designation for interrupting the magnifying playback operation is input in step S131 by the same processing as described in step S107 in FIG. 3, the flow advances to step S133. In step S133, the third external display device 27 is turned off, and thus the image playback processing including the magnifying playback processing is ended.

A display example will be described next in detail, in which after images are sensed by the digital camera of the present invention in the continuous shooting mode wherein images are taken successively at a predetermined interval, the images are confirmed on the basis of the above-described image playback processing and magnifying playback processing.

FIGS. 5A to 5D are views showing four images sensed in the continuous shooting mode of the digital camera of the present invention. As described above, an image number is automatically assigned to each image by the digital camera at the time of image sensing. It is assumed that image numbers 201 to 204 are assigned to the images shown in FIGS. 5A to 5D.

When the user wants magnifying playback of a desired region of the image shown in FIG. 5A after sensing the image, he/she operates the selection button 39 and first information input unit 32 first to play back the image having the image number 201 (step S104). When the magnifying playback button 44 is pressed during playback of the image, the magnifying playback processing starts (step S114). The magnification ratio and magnifying center position are set by the operations in step S125 to S127 in FIG. 4 to magnify and display the desired portion of the image.

Figure 6A:
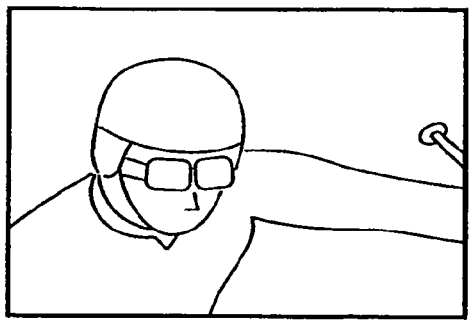
FIGS. 6A to 6E are views showing examples of the magnified images of FIGS. 5A to 5D.
Figure 7A:
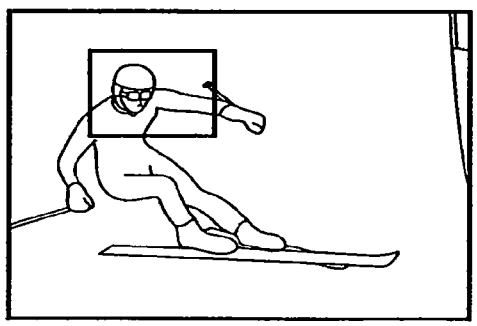
FIGS. 7A to 7D are views showing the positional relationship between the continuously taken images and magnified regions according to the first embodiment of the present invention.

FIG. 6A shows an example of a magnified image desired by the user, which is displayed as a result of the magnifying operation for the image shown in FIG. 5A. The magnified region in the image shown in FIG. 5A at this time is indicated by a rectangular frame in FIG. 7A. The operation until the image shown in FIG. 6A is obtained is the same as that described with reference to FIGS. 12A to 13D.

To display the next image 202 (FIG. 5B) from the state in which the magnified image of FIG. 6A is displayed, the selection button 39 is pressed (step S129), and the first information input unit 32 is rotated clockwise (step S139). On the basis of information from the first information input unit 32, the control device 21 calculates that the image number increases from 201 to 202 and stores the image number 202 in the internal storage device 20 (step S142).

To update the time until display OFF, the timer t is reset and restarted (step S121). Image data with the image number 202 is loaded from the external storage device 19 to the internal storage device 20 (step S122).

Next, the control device 21 acquires, from the internal storage device 20, the magnification ratio and position information of the magnified image which are stored in advance (step S123). The magnified image is generated from the image data with the image number 202, and thus the magnified image of the same magnification ratio at the same position as those of the image with the image number 201 is displayed on the third external display device 27 (step S124).

Figure 5B:
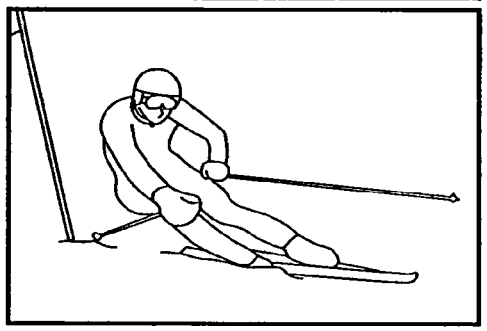
Figure 6B:
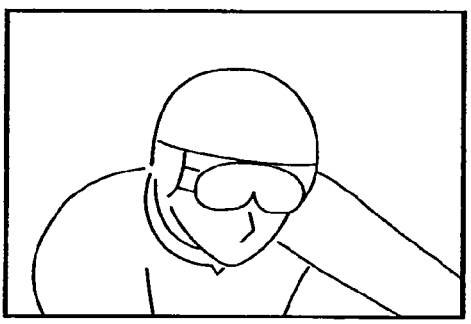
Figure 7B:
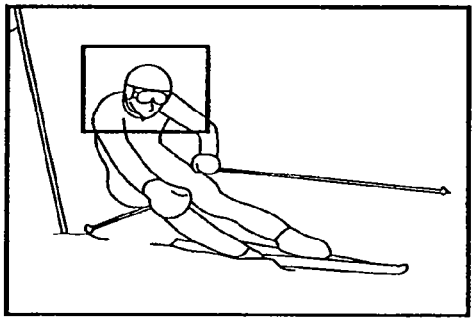

FIG. 6B shows the image displayed at this time. The magnified region corresponding to the image shown in FIG. 6B in the image shown in FIG. 5B is indicated by a rectangular frame in FIG. 7B. When the image is displayed on the basis of the same magnification ratio and magnifying center position as those of the image with the image number 201 in the above-described way, the magnified image desired by the user can be obtained in this case.

Figure 5C:
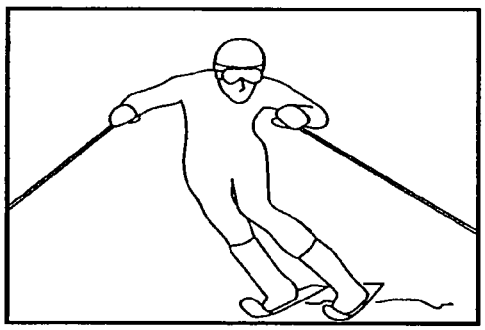
Figure 6C:
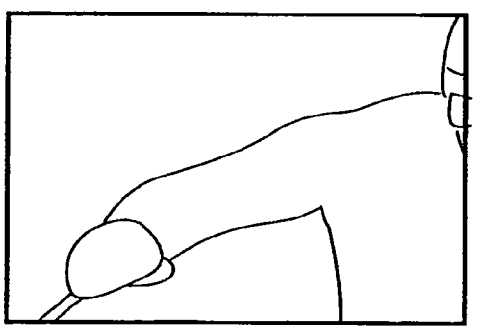
Figure 6D:
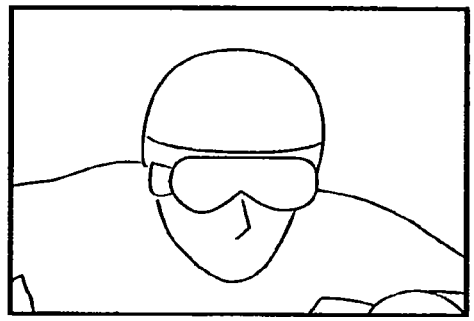
Figure 7C:
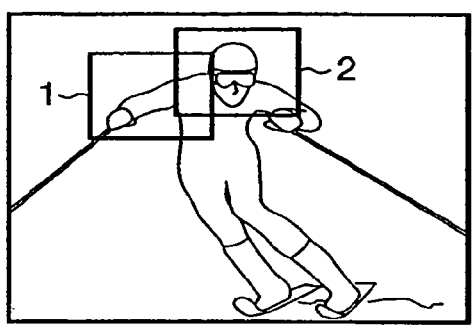

When the user presses the selection button 39 and rotates the first information input unit 32 clockwise to see the next magnified image with the image number 203 (FIG. 5C), the magnified image shown in FIG. 6C is displayed. The magnified region corresponding to the image shown in FIG. 6C in the image shown in FIG. 5C is indicated by rectangular frame 1 in FIG. 7C. If the magnified image desired by the photographer is in the region surrounded by rectangular frame 2 in FIG. 7C, the image shown in FIG. 6D can be obtained by slightly moving the magnification region to the right and upper sides.

Figure 5D:
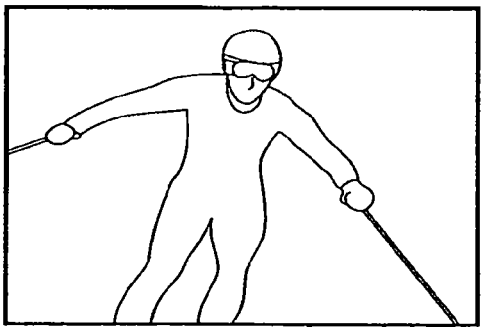
Figure 6E:
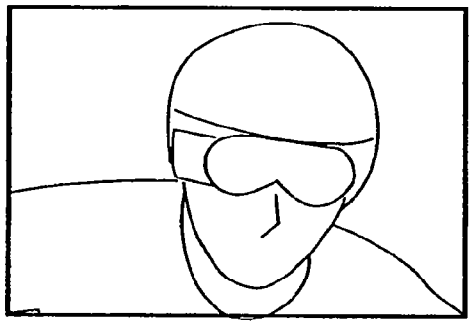
Figure 7D:
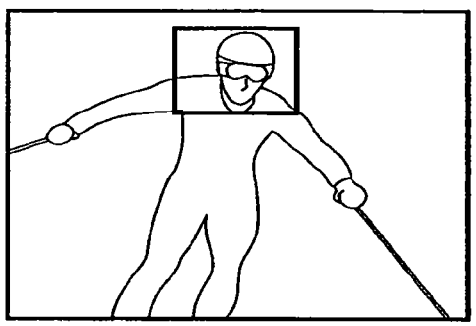

When the photographer presses the selection button 39 and rotates the first information input unit 32 clockwise to see the next magnified image with the image number 204 (FIG. 5D), the image shown in FIG. 6E is displayed. The magnified region corresponding to the image in FIG. 6E in the image shown in FIG. 5D is indicated by a rectangular frame in FIG. 7D.

As described above, the position where the user wants to confirm the series of images sensed in the continuous shooting mode does not changes so greatly. In the digital camera according to the first embodiment, since magnifying playback of an image is executed at the same region as that of the precedingly magnified and displayed image, the images can be confirmed easily and quickly.

Figure 8:
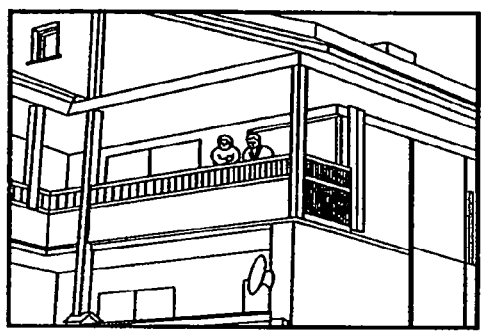
FIG. 8 is a view showing another image according to the first embodiment of the present invention.
Figure 9:
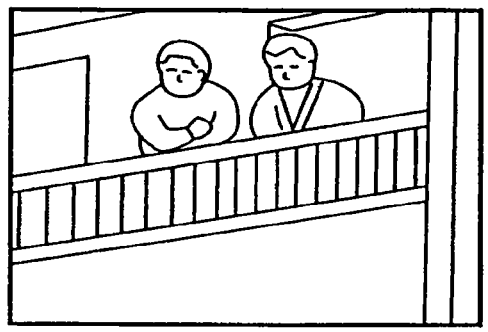
FIG. 9 is a view showing an example of the magnified image of the image shown in FIG. 8.

The region to be magnified in an image sometimes largely changes in accordance with a change of the sensing scene. For example, assume that an image shown in FIG. 8 has an image number 205 next to the image with the image number 204 shown in FIG. 5D, and the central portion of the image is the region to be magnified desired by the user. In this case, the central portion of the image can quickly be magnified and displayed by pressing the home position button 46 (step S128). FIG. 9 shows the magnified image of the central portion of the image shown in FIG. 8.

A user's favorite position can be registered as the home position to which the magnification region is moved in response to the operation of the home position button 46. Some users have compositions to their own tastes and therefore a predetermined position to be confirmed by the magnifying playback function. When each user registers his/her favorite position as the home position, favorite portion can be magnified and played back by pressing the home position button 46 during magnifying playback processing.

The first embodiment has been described by using the continuous shooting mode to help understanding the arrangement of the present invention. However, the present invention is not limited to this. Even in single image shooting without using the continuous shooting mode, the point to be magnified is often almost the same throughout the images because of, e.g., the user's taste in composition. Hence, the magnifying playback function of the digital camera of the present invention can effectively be used.

<Second Embodiment>

The second embodiment of the present invention will be described next. The arrangement of a digital camera according to the second embodiment is the same as that shown in FIGS. 1, 2A, and 2B described in the first embodiment.

Some conventional digital cameras have a function of, after sensing in the continuous shooting mode, automatically sequentially displaying images in the time-series, i.e., chronological order. This function is also called a "continuous shooting slide show mode". Since the continuously sensed images can sequentially be confirmed in the time-series order in this mode, the correlation between the series of images along the time axis can also be checked. In the second embodiment, a magnifying playback operation in the continuous shooting slide show mode will be described.

Figure 10:
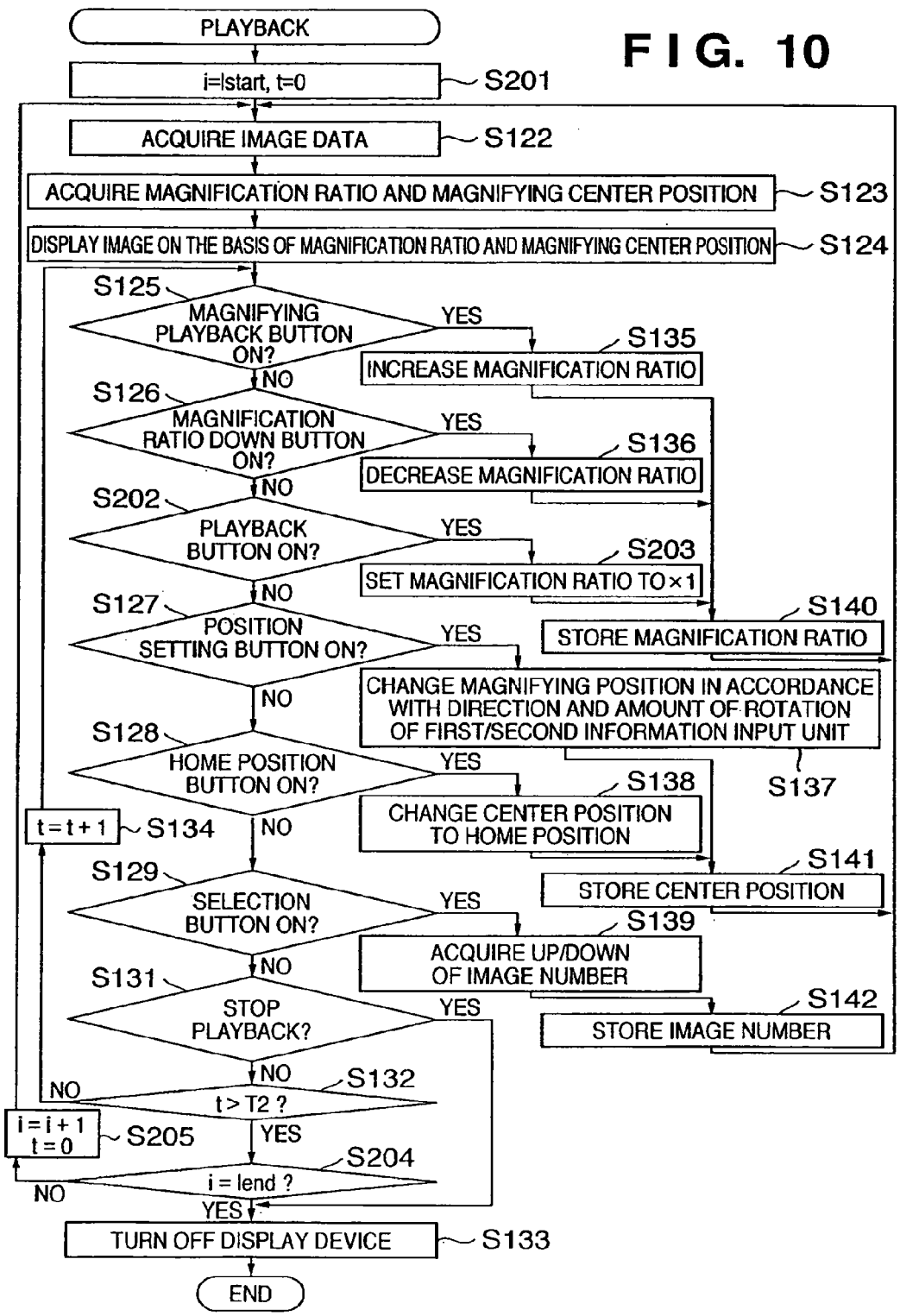
FIG. 10 is a flow chart showing image playback processing according to the second embodiment of the present invention.
Figure 12A:
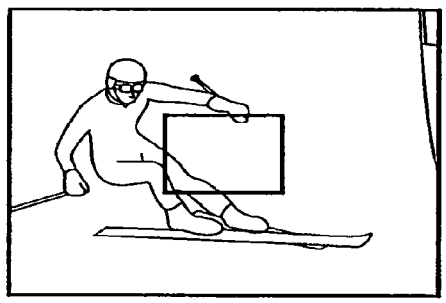
FIGS. 12A to 12D are views showing the positional relationship between the image shown in FIG. 11A and magnified regions.
Figure 12B:
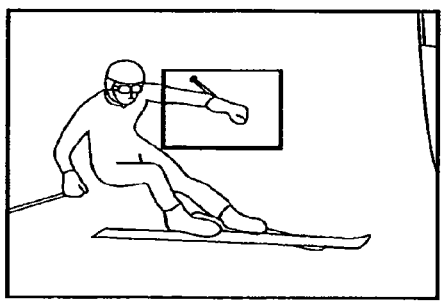
Figure 12C:
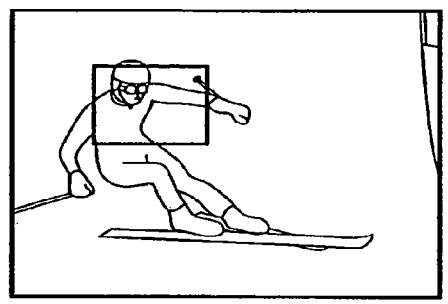
Figure 12D:
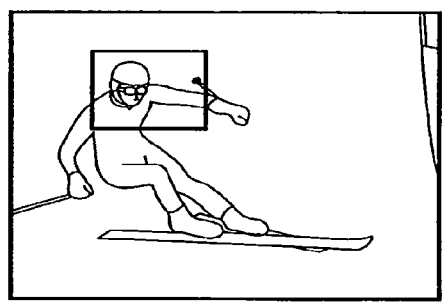
Figure 13A:
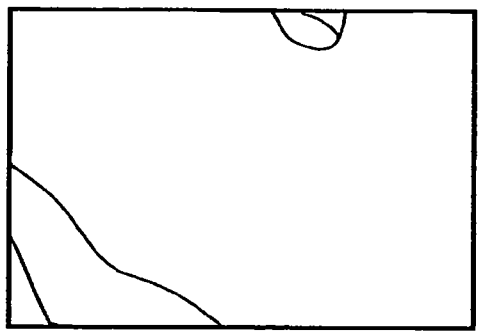
FIGS. 13A to 13D are views showing examples of the magnified images of the image shown in FIG. 11A.
Figure 13B:
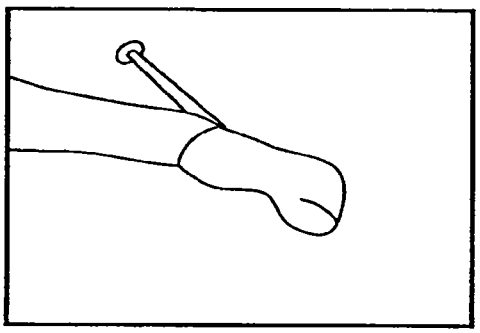
Figure 13C:
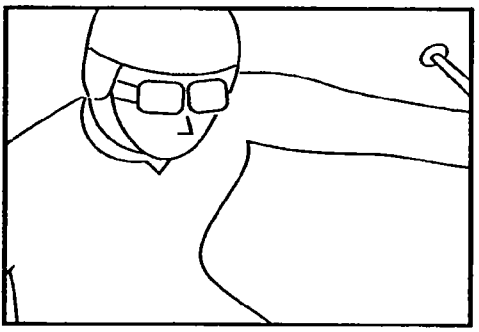
Figure 13D:
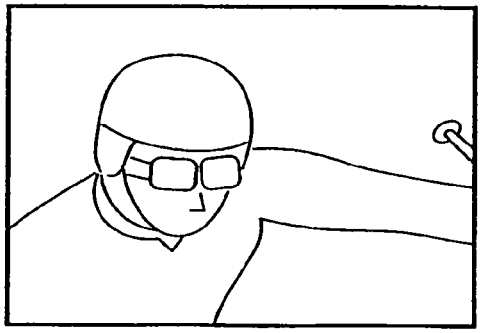
Figure 14A:
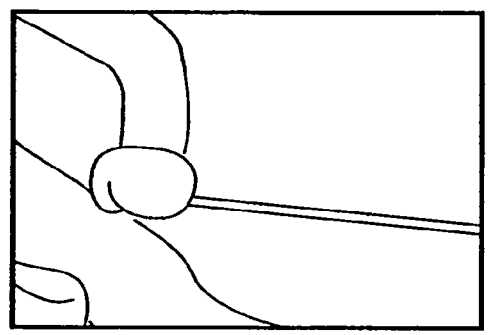
FIGS. 14A and 14B are views showing examples of the magnified images of the image shown in FIG. 11B.
Figure 14B:
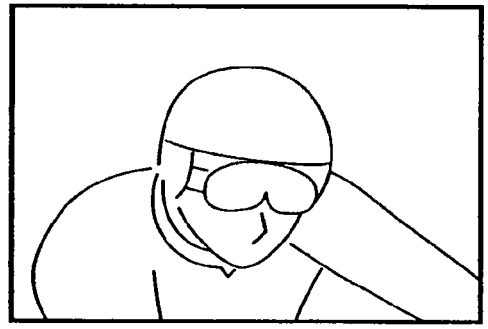

FIG. 10 is a flow chart showing image playback processing in the continuous shooting slide show mode in the digital camera according to the second embodiment. The same step numbers as in FIG. 4 denote the same operations in FIG. 10. Operations different from FIG. 4 will mainly be described. As preconditions, assume that image sensing is executed in advance in the continuous shooting mode, and image numbers are sequentially assigned to a series of images. In the series of images, the oldest image number and the latest image number are stored in an internal storage device 20 as Istart and Iend, respectively.

When image playback processing in the continuous shooting slide show mode starts, in step S201, the first image number Istart in the continuous shooting mode is read out from the internal storage device 20 and set in an image number counter i that counts the image number. In addition, a timer t that counts the display time is reset to 0 and started.

In step S122, a control device 21 acquires image data on the basis of the image number i. In step S123, the magnification ratio and image position stored in the internal storage device 20 are acquired. The image data is acquired either from an external storage device 19 or from the internal storage device 20 like in a REC review mode wherein each sensed image is displayed for a short time immediately after sensing. In step S124, the image of the image number i is displayed on a third external display device 27 on the basis of the magnification ratio and magnifying center position stored in the internal storage device 20 in advance. In the second embodiment, a magnification ratio at which an entire image can be displayed on the third external display device 27 is stored as the initial value of the magnification ratio, and the center is stored as the initial value of the magnifying center position. Operations in steps S125 to S142 are the same as in FIG. 4. If a playback button 41 is pressed in step S202, the magnification ratio is returned in step S203 to that for the normal playback size (×1) at which the sensed image can be fully displayed. In step S140, the changed magnification ratio is stored in the internal storage device 20.

If no button operation is executed in steps S125 to S131 or in step S202, the image displayed in step S124 is continuously displayed until the timer t exceeds a preset time T2 in step S132. In step S134, the value of the timer t is incremented by one. When the timer t exceeds T2, the flow advances to step S204 to determine whether the image number counter i holds the image number Iend which indicates the last image sensed in the continuous shooting mode. If NO in step S204, the flow advances to step S205 to display the next image. The value of the image number counter i is incremented by one. In addition, the timer t is reset to 0 and restarted. Then, the flow returns to step S122 to acquire the image with the next image number and to play back the next image.

When image playback stop designation is input in step S131, or it is determined in step S204 that display of the last image in the continuous shooting slide show mode is ended, the third external display device 27 is turned off in step S133, thus ending the image playback processing.

A display example will be described next in detail with reference to FIGS. 5A to 7D, in which when images sensed in the continuous shooting mode are sequentially played back and displayed in the continuous shooting slide show mode by the digital camera of the present invention, the images are confirmed on the basis of the above-described image playback processing. As in the first embodiment, image numbers 201 to 204 are assigned to the images shown in FIGS. 5A to 5D.

When the user detaches his/her hand from a release button 31 (particularly, an image sensing designation switch (SW2) 31b), continuous shooting is ended. The control device 21 starts image display preprocessing. In this case, 201 is stored as Istart, and 204 is stored as Iend. When the magnification ratio stored in the internal storage device 20 corresponds to full window display, the image shown in FIG. 5A is displayed in step S124. In the REC review mode, the data of the sensed images still remain in the internal storage device 20, and they are sequentially stored in the external storage device 19.

After the start of display of the image (the image shown in FIG. 5A) of the image number 201, when the user wants magnifying display of a desired region of the image within the time T2, he/she sets the magnification ratio and magnifying center position by the operations in step S125, S126, and S127 in FIG. 10 to magnify and display the desired part of the image. In the first embodiment, the third external display device 27 is turned off if no button operation is executed for a predetermined time during display. In the continuous shooting slide show mode, when the time has elapsed, the next image is displayed. FIG. 6A shows an example of a magnified image desired by the user, which is displayed as a result of the operations in steps S125, S126, and S127. The magnified region in the image shown in FIG. 5A at this time is indicated by a rectangular frame in FIG. 7A.

When the time T2 has elapsed while the user confirms the image displayed in the window as shown in FIG. 6A, the flow advances to step S204. Since the value of the image number counter i is smaller than Iend, the next image is displayed. More specifically, the image number is changed to 202 (the image shown in FIG. 5B), the timer t is initialized to 0 (step S205), and the flow returns to step S122 to start display processing of the image of the image number 202.

The image data with the image number 202 is loaded either from the external storage device 19, or from the internal storage device 20 in the REC review mode (step S122).

Next, the control device 21 acquires, from the internal storage device 20, the magnification ratio and magnifying center position stored when the image of the image number 201 is displayed (step S123). A magnified image is generated from the image of the image number 202. The magnified image having the same magnifying center position and magnification ratio as those of the image with the image number 201 is displayed on the third external display device 27 (step S124).

FIG. 6B shows the image displayed at this time. The magnified region corresponding to the image shown in FIG. 6B in the image shown in FIG. 5B is indicated by a rectangular frame in FIG. 7B. When the image is displayed on the basis of the same magnification ratio and magnifying center position as those of the image of the image number 201 in the above-described way, the user can confirm the desired magnified image with sufficient time even in the time T2.

When the time T2 has elapsed while the user confirms the image shown in FIG. 6B, the above-described processing is repeated to display the next image (FIG. 5C) of the image number 203.

FIG. 6C shows an image displayed at this time. The magnified region corresponding to the image shown in FIG. 6C in the image shown in FIG. 5C is indicated by a rectangular frame 1 in FIG. 7C. If the image desired by the user is in the region surrounded by rectangular frame 2 in FIG. 7C, the image shown in FIG. 6D can be obtained by slightly moving the magnification region to the right and upper sides. As described above, even in a short time within the time T2, the user can change the position of the magnified image and confirm the magnified image.

When the time T2 has further elapsed, a magnified image shown in FIG. 6E, which has the image number 204, is displayed. The magnified region corresponding to the image shown in FIG. 6E in the image shown in FIG. 5D is indicated by a rectangular frame in FIG. 7D. The region is the same as that shown in FIG. 6O. Hence, the user can confirm the desired magnified image without changing the magnified region.

As described above, the image portion which the user wants to confirm in the series of images sensed in the continuous shooting mode does not move so greatly. In the digital camera according to the second embodiment, since magnifying playback of an image is executed such that the same magnification region of the image as that of the precedingly magnified and displayed image is displayed, the images can be confirmed easily and quickly.

In the second embodiment, the series of images obtained by continuous shooting are played back in the continuous shooting slide show mode. In the REC review mode, by storing the magnification ratio and magnifying center position in, e.g., a nonvolatile storage device after the end of sensing, the same region as the magnified region precedingly displayed in the REC review mode can be magnified and displayed even in single image shooting at different time. In the single image shooting mode, the same value is held as Istart and Iend. In addition, a mode wherein all images stored in the external storage device 19 are subjected to the slide show can be implemented by setting Istart for the first stored image and Iend for the last stored image.

In some cases, a completely different image is sensed immediately after continuous shooting. For example, assume that the image shown in FIG. 8 has an image number 205 next to the image shown in FIG. 50. In this case, the magnified image of the central portion of the image can be quickly displayed, as shown in FIG. 9, by pressing a home position button 46 as described above in the first embodiment.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image display apparatus which displays a plurality of images comprising:
    a position designation unit configured to, in response to an operation by a user during displaying a first image, designate a position of magnification part;
    a display control unit configured to magnify a part of the first image on the basis of the position of the magnification part designated by the position designation unit and to reproduce and display the magnified part of the first image on a display unit; and
    an image changing unit configured to change the display from the magnified part of the first image to a magnified part of a second image on the display unit during reproduction, the second image being different from the first image, based on the position of the magnification part designated by the position designation unit during the first image is displayed.

2. The apparatus according to claim 1 further comprising:
    a display magnification designation unit configured to, in response to an operation by the user during displaying the first image, designate a display magnification ratio for magnifying an image;
    wherein the magnified part of the first image is a magnified image of the first image based on the display magnification ratio designated by the display magnification designation unit during the first image is displayed and the position of the magnification part designated by the position designation unit during the first image is displayed, and the magnified part of the second image is a magnified image of a part of the second image different from the first image based on the display magnification ratio designated by the display magnification designation unit during the first image is displayed and the position of the magnification part designated by the position designation unit during the first image is displayed.

3. The apparatus according to claim 1 further comprising an end control unit configured to control to end displaying of an image on the display unit in a case where a predetermined period of time elapses without receiving any of a plurality of inputs including at least an input from the position designation unit.

4. The apparatus according to claim 1 further comprising an image sensing unit.

5. The apparatus according to claim 1, wherein the display control unit executes the magnification in an image playback mode.

6. The apparatus according to claim 1, wherein the display control unit executes the magnification in a REC review mode in which a sensed image is displayed for said predetermined period of time immediately after sensing the image.

7. The apparatus according to claim 1, wherein the display control unit displays the plurality of images in a slide show mode in which each of a plurality of pre-recorded images is sequentially magnified, in accordance with the position of the magnification part designated by the position designation unit during the first image is displayed, and displayed in the display unit for said predetermined period of time.

8. The apparatus according to claim 1, wherein the display control unit executes the magnification in a continuous shooting slide show mode in which continuously sensed images are sequentially displayed for the predetermined time for each image immediately after continuous shooting.

9. The apparatus according to claim 1, further comprising a return operation member,
wherein when said return operation member is operated during the magnified part of the second image is displayed, a display control unit changes an image to be displayed from the magnified part of the second image to a magnified image of a part of the second image based on a preset position.

10. The apparatus according to claim 1, wherein the image display apparatus is a digital camera.

11. The apparatus according to claim 1, wherein the position of magnification part to be magnified is allowed to be changed during either of the first and second images is displayed.

12. The apparatus according to claim 2, wherein the display magnification designation unit receives from the user an instruction to increase and an instruction to decrease the magnification ratio of the magnification part designated by the position designation unit.

13. The apparatus according to claim 2 further comprising a storage control unit configured to control to store in a storage unit position information about the position of the magnification part designated by the position designation unit during displaying the first image and magnification ratio information about the magnification ratio designated by the display magnification designation unit during displaying the first image.

14. The apparatus according to claim 13 further comprising:
an image selection unit configured to select the second image recorded on a memory, different from the first image, to be displayed on the display unit; and
an acquisition unit configured to acquire from the storage unit the position information and the magnification ratio information in response to the image selection unit selecting the second image,
wherein the image changing unit changes the display from the magnified part of the first image to the magnified part of the second image on the display unit based on the position information and the magnification ratio information acquired by the acquisition unit.

15. The apparatus according to claim 14, wherein the position information stored in the storage unit is updated when a different position is designated by the position designation unit, and the magnification ratio information stored in the storage unit is updated when a different magnification ratio is designated by the display magnification designation unit, and the image changing unit uses the position information and the magnification ratio information stored in the storage unit for a third image to be displayed subsequent to the second image.

16. The apparatus according to claim 1 further comprising a storage control unit configured to control to store information about the position of the magnification part designated by the position designation unit in a storage unit during displaying the first image.

17. The apparatus according to claim 16 further comprising:
an image selection unit configured to select the second image recorded on a memory, different from the first image, to be displayed on the display unit; and
an acquisition unit configured to acquire from the storage unit the information in response to the image selection unit selecting the second image,
wherein the image changing unit changes the display from the magnified part of the first image to the magnified part of the second image on the display unit based on the information acquired by the acquisition unit.

18. The apparatus according to claim 17, wherein the information stored in the storage unit is updated when a different position is designated by the position designation unit, and the image changing unit uses the information stored in the storage unit for a third image to be displayed subsequent to the second image.

19. The apparatus according to claim 1, wherein the first image and the second image are sensed by a digital camera.

20. The apparatus according to claim 1, wherein, if the position of the magnified part of the second image is not changed during the second image is displayed, the image changing unit changes the display from the magnified part of the second image to a magnified part of a third image on the display unit during reproduction, the third image being different from the first image and the second image, based on the position of the magnification part designated by the position designation unit during the first image is displayed.

21. An image display control method for displaying a plurality of images comprising:
a position designation step of, in response to an operation by a user during displaying a first image, designating a position of magnification part;
a display control step of magnifying a part of the first image on the basis of the position of the magnification part designated in the position designation step and to reproduce and display the magnified part of the first image on a display unit;
an image changing step of changing the display from the magnified part of the first image to a magnified part of a second image on the display unit during reproduction, the second image being different from the first image, based on the position of the magnification part designated in the position designation step during the first image is displayed.

22. The method according to claim 21 further comprising:
a display magnification designation step of, in response to an operation by the user during displaying the first image, designating a display magnification ratio for magnifying an image;
wherein the magnified part of the first image is a magnified image of the first image based on the display magnification ratio designated in the display magnification designation step during the first image is displayed and the position of the magnification part designated in the position designation step during the first image is displayed, and the magnified part of the second image is a magnified image of a part of the second image different from the first image based on the display magnification ratio designated in the display magnification designation step during the first image is displayed and the position of the magnification part designated in the position designation step during the first image is displayed.

23. The method according to claim 21 further comprising an end control step of controlling to end displaying of an image on the display unit in a case where a predetermined period of time elapses without receiving any of a plurality of inputs including at least an input in the position designation step.

24. The method according to claim 21, wherein further comprising an image sensing step.

25. The method according to claim 21, wherein the display control step executes the magnification in an image playback mode.

26. The method according to claim 21, wherein the display control step executes the magnification in a REC review mode in which a sensed image is displayed for said predetermined period of time immediately after sensing the image.

27. The method according to claim 21, wherein the display control step displays the plurality of images in a slide show mode in which each of a plurality of pre-recorded images is sequentially magnified, in accordance with the position of the magnification part designated in the position designation step during the first image is displayed, and displayed in the display unit for said predetermined period of time.

28. The method according to claim 21, wherein the display control step executes the magnification in a continuous shooting slide show mode in which continuously sensed images are sequentially displayed for the predetermined time for each image immediately after continuous shooting.

29. The method according to claim 21, further comprising a return operation step of receiving a return operation from the user,
wherein when said return operation is received during the magnified part of the second image is displayed, a display control step changes an image to be displayed from the magnified part of the second image to a magnified image of a part of the second image based on a preset position.

30. The method according to claim 21, wherein the position of magnification part to be magnified is allowed to be changed during either of the first and second images is displayed.

31. The apparatus according to claim 21, wherein the image display control method is executed in a digital camera.

32. The method according to claim 22, wherein the display magnification designation step receives from the user an instruction to increase and an instruction to decrease the magnification ratio of the magnification part designated in the position designation step.

33. The method according to claim 22 further comprising a storage control step of controlling to store in a storage unit position information about the position of the magnification part designated in the position designation step during displaying the first image and magnification ratio information about the magnification ratio designated in the display magnification designation step during displaying the first image.

34. The method according to claim 33 further comprising:
an image selection step of selecting the second image recorded on a memory, different from the first image, to be displayed on the display unit; and
an acquisition step of acquiring from the storage unit the position information and the magnification ratio information in response to the image selection step selecting the second image,
wherein the image changing step changes the display from the magnified part of the first image to the magnified part of the second image on the display unit based on the position information and the magnification ratio information acquired in the acquisition step.

35. The method according to claim 34, wherein the position information stored in the storage unit is updated when a different position is designated in the position designation step, and the magnification ratio information stored in the storage unit is updated when a different magnification ratio is designated in the display magnification designation step, and the image changing step uses the position information and the magnification ratio information stored in the storage unit for a third image to be displayed subsequent to the second image.

36. The method according to claim 21 further comprising a storage control step of controlling to store information about the position of the magnification part designated in the position designation step in a storage unit during displaying the first image.

37. The method according to claim 36 further comprising:
an image selection step of selecting the second image recorded on a memory, different from the first image, to be displayed on the display unit; and
an acquisition step of acquiring from the storage unit the information in response to the image selection step selecting the second image,
wherein the image changing step changes the display from the magnified part of the first image to the magnified part of the second image on the display unit based on the information acquired in the acquisition step.

38. The method according to claim 37, wherein the information stored in the storage unit is updated when a different position is designated in the position designation step, and the image changing step uses the information stored in the storage unit for a third image to be displayed subsequent to the image.

39. The method according to claim 21, wherein the first image and the second image are sensed by a digital camera.

40. The method according to claim 21, wherein, if the position of the magnified part of the second image is not changed during the second image is displayed, the image changing step changes the display from the magnified part of the second image to a magnified part of a third image on the display unit during reproduction, the third image being different from the first image and the second image, based on the position of the magnification part designated in the position designation step during the first image is displayed.

41. A non-transitory readable storage medium having stored thereon a program which is executable by an image processing apparatus, the program having a program code for realizing the image display control method according to claim 21.

* * * * *